US011978930B2

(12) United States Patent
Yamanaka et al.

(10) Patent No.: US 11,978,930 B2
(45) Date of Patent: May 7, 2024

(54) HYDROGEN SUPPLY SYSTEM, FUEL CELL SYSTEM, AND WORKING MACHINE INCLUDING HYDROGEN SUPPLY SYSTEM AND FUEL CELL SYSTEM

(71) Applicant: KUBOTA CORPORATION, Osaka (JP)

(72) Inventors: Yukifumi Yamanaka, Osaka (JP); Takahiro Takaki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/840,210

(22) Filed: Jun. 14, 2022

(65) Prior Publication Data

US 2023/0021098 A1 Jan. 19, 2023

(30) Foreign Application Priority Data

Jul. 15, 2021 (JP) .................. 2021-117179

(51) Int. Cl.
| | |
|---|---|
| *H01M 8/04* | (2016.01) |
| *H01M 8/04029* | (2016.01) |
| *H01M 8/04082* | (2016.01) |
| *H01M 8/04089* | (2016.01) |
| *H01M 8/0438* | (2016.01) |
| *H01M 8/04701* | (2016.01) |

(52) U.S. Cl.
CPC ... *H01M 8/04097* (2013.01); *H01M 8/04029* (2013.01); *H01M 8/04201* (2013.01); *H01M 8/04388* (2013.01); *H01M 8/04731* (2013.01)

(58) Field of Classification Search
CPC ......... H01M 8/04097; H01M 8/04201; H01M 8/04388; H01M 8/04731
See application file for complete search history.

(56) References Cited

U.S. PATENT DOCUMENTS

2010/0098980 A1\* 4/2010 Ishikawa ........... H01M 8/04089
429/429

FOREIGN PATENT DOCUMENTS

| JP | 2005 063703 A | 3/2005 |
| JP | 2006 200563 A | 8/2006 |
| JP | 5 237870 B2 | 7/2013 |
| WO | 2018/174055 A1 | 9/2018 |

OTHER PUBLICATIONS

Search Report dated Feb. 9, 2023 in European Patent Application No. 22 17 9296.3

\* cited by examiner

*Primary Examiner* — Olatunji A Godo
(74) *Attorney, Agent, or Firm* — Greenblum & Bernstein, P.L.C.

(57) ABSTRACT

A hydrogen supply system that supplies hydrogen gas to a fuel cell and causes the fuel cell to generate electricity includes a plurality of hydrogen tanks that each store hydrogen gas, and a hydrogen gas supply path that supplies the hydrogen gas to the fuel cell from each of the plurality of hydrogen tanks. At least one hydrogen tank of the plurality of hydrogen tanks is a first reserve tank that is connected to a hydrogen gas collecting pipe or a hydrogen gas recovery pipe, and that stores hydrogen gas that was not used in generating electricity in the fuel cell.

20 Claims, 3 Drawing Sheets

HYDROGEN SUPPLY SYSTEM, FUEL CELL SYSTEM, AND WORKING MACHINE INCLUDING HYDROGEN SUPPLY SYSTEM AND FUEL CELL SYSTEM

CROSS REFERENCE TO RELATED APPLICATIONS

This application claims the benefit of priority to Japanese Patent Application No. 2021-117179 filed on Jul. 15, 2021. The entire contents of this application are hereby incorporated herein by reference.

BACKGROUND OF THE INVENTION

1. Field of the Invention

The present invention relates to a hydrogen supply system that supplies hydrogen gas to a fuel cell, a fuel cell system, and a working machine including the hydrogen supply system and the fuel cell system.

2. Description of the Related Art

Hitherto, as disclosed in the pamphlet of International Publication No. 2018/174055, a hydrogen tank including a hydrogen storage alloy therein is often used in a system that supplies hydrogen gas to a fuel cell, and such a hydrogen tank is also called a MH (metal hydride) tank. A hydrogen storage alloy absorbs hydrogen gas through pressure increase or cooling, and releases hydrogen gas through pressure reduction or heating. Since a hydrogen storage alloy is capable of absorbing hydrogen having a volume that is greater than or equal to 1000 times the volume of the hydrogen storage alloy itself, even a small tank having a pressure of less than 1 MPa in a security regulation for high-pressure gas is capable of storing a large volume of hydrogen gas.

SUMMARY OF THE INVENTION

In the system disclosed in the pamphlet of International Publication No. 2018/174055 above, in order to take out hydrogen gas from the hydrogen tank including a hydrogen storage alloy therein, heating needs to be performed. However, when the amount of hydrogen gas required for the fuel cell varies, the temperature needs to be controlled in accordance with the variation. However, it is difficult to control without delay the amount of heat to be applied to the hydrogen storage alloy.

In particular, when a state in which a large amount of hydrogen gas is required (state in which a large amount of heat is applied) becomes a state in which hydrogen gas is no longer required, the pressure of hydrogen gas inside the hydrogen tank is suddenly increased. In order to conform to the security regulation for high-pressure gas, a general hydrogen tank includes a relief valve that operates at a pressure of 1.0 MPa or higher. If temperature control cannot be performed in time, the relief valve opens and a large amount of excess hydrogen gas is released into the atmosphere. As a result, the hydrogen gas is wasted. When excess hydrogen gas is released into a hermetically sealed space, the hermetically sealed space needs to be highly ventilated.

The present invention has been made to solve such problems of the related art, and an object of the present invention is to provide a hydrogen supply system, a fuel cell system, and a working machine including the hydrogen supply system and the fuel cell system, which are capable of unwastefully reusing excess hydrogen gas that was not used in a fuel cell even though output from a hydrogen tank, without releasing the hydrogen gas into the atmosphere.

A hydrogen supply system according to a first aspect of the present invention is a hydrogen supply system that supplies hydrogen gas to a fuel cell that generates electric power by using the hydrogen gas. The hydrogen supply system includes a plurality of hydrogen tanks that each store hydrogen gas, and a hydrogen gas supply path that supplies the hydrogen gas to the fuel cell from each of the plurality of hydrogen tanks ($53a$ to $53e$). At least one hydrogen tank of the plurality of hydrogen tanks is a reserve tank that is connected to the hydrogen gas supply path via a hydrogen gas recovery path, and that stores hydrogen gas that was not used in generating electricity in the fuel cell.

The hydrogen supply system may further include a control section that controls suction of the hydrogen gas that was not used in generating the electricity into each of a plurality of the reserve tanks.

The hydrogen gas recovery path may be provided with first relief valves that each open and close a corresponding one of the plurality of the reserve tanks, and the control section may perform control so that, when a pressure of hydrogen gas inside the hydrogen gas supply path is greater than or equal to a predetermined set value, each of the first relief valves is opened and the hydrogen gas that was not used in generating the electricity in the fuel cell is sucked into each of the plurality of the reserve tanks.

Each of the plurality of the reserve tanks may include a second relief valve that releases hydrogen gas inside a corresponding one of the plurality of the reserve tanks into atmosphere, and the control section may perform control so that, when a pressure of the hydrogen gas inside each of the plurality of the reserve tanks is greater than or equal to a predetermined set value, each of the second relief valves is opened and hydrogen inside a corresponding one of the plurality of the reserve tanks is discharged.

The control section may perform control so that, in storing in the reserve tanks the hydrogen gas that was not used in generating the electricity, when an amount of hydrogen gas that is stored inside a predetermined one of the reserve tanks becomes greater than or equal to a predetermined amount, suction with respect to the predetermined one of the reserve tanks is stopped, and suction with respect to the reserve tank other than the predetermined one of the reserve tanks is started.

Each of the plurality of the reserve tanks may include a hydrogen on-off valve that opens and closes the hydrogen gas supply path, and a hot water on-off valve that opens and closes a hot water path in which hot water for warming an inside of each of the plurality of the reserve tanks is to flow. The control section may control opening and closing of the hydrogen on-off valve of each of the plurality of the reserve tanks and opening and closing of the hot water on-off valve of each of the plurality of the reserve tanks.

The plurality of hydrogen tanks may be configured to be connected in series or in parallel.

A hydrogen supply system according to a second aspect of the present invention is a hydrogen supply system that supplies hydrogen gas to a fuel cell that generates electric power by using the hydrogen gas. The hydrogen supply system includes a plurality of hydrogen tanks that each store hydrogen gas, and a hydrogen gas supply path that supplies the hydrogen gas to the fuel cell from each of the plurality of hydrogen tanks. Two hydrogen tanks of the plurality of hydrogen tanks are a first reserve tank and a second reserve tank that are connected to the hydrogen gas supply path via a hydrogen gas recovery path, and that store hydrogen gas that was not used in generating electricity in the fuel cell.

The hydrogen supply system may further include a control section that controls suction of the hydrogen gas that was not used in generating the electricity into each of the first and second reserve tanks.

The control section may perform control so that, in storing in the first and second reserve tanks the hydrogen gas that was not used in generating the electricity, when an amount of hydrogen gas that is stored in the first reserve tank becomes greater than or equal to a predetermined amount, suction with respect to the first reserve tank is stopped, and suction with respect to the second reserve tank is started.

The first and second reserve tanks may each include a hydrogen on-off valve that opens and closes the hydrogen gas supply path, and a hot water on-off valve that opens and closes a hot water path in which hot water for warming an inside of each of the first and second reserve tanks is to flow, and the control section may perform control so that the hydrogen on-off valve and the hot water on-off valve of the first reserve tank are closed and so that the hydrogen on-off valve and the hot water on-off valve of the second reserve tank are opened.

The first and second reserve tanks may each include a hydrogen on-off valve that opens and closes the hydrogen gas supply path, and a hot water on-off valve that opens and closes a hot water path in which hot water for warming an inside of each of the first and second reserve tanks is to flow, and the control section may perform control so that the hydrogen on-off valve and the hot water on-off valve of the second reserve tank are closed and so that the hydrogen on-off valve and the hot water on-off valve of the first reserve tank are opened.

The plurality of hydrogen tanks may be configured to be connected in series or in parallel.

A hydrogen supply system according to a third aspect of the present invention is a hydrogen supply system that supplies hydrogen gas to a fuel cell that generates electric power by using the hydrogen gas. The hydrogen supply system includes at least one hydrogen tank that stores hydrogen gas, a hydrogen gas supply path that supplies the hydrogen gas to the fuel cell from each of the at least one hydrogen tank including a plurality of the hydrogen tanks, and at least one reserve tank that is connected to the hydrogen gas supply path via a hydrogen gas recovery path, and that stores hydrogen gas that was not used in generating electricity in the fuel cell.

The hydrogen supply system may further include a control section that controls suction of the hydrogen gas that was not used in generating the electricity into each of the at least one reserve tank including a plurality of the reserve tanks.

The hydrogen gas recovery path may be provided with first relief valves that each open and close a corresponding one of the plurality of the reserve tanks, and the control section may perform control so that, when a pressure of hydrogen gas inside the hydrogen gas supply path is greater than or equal to a predetermined set value, each of the first relief valves is opened and the hydrogen gas that was not used in generating the electricity in the fuel cell is sucked into each of the plurality of the reserve tanks.

Each of the plurality of the reserve tanks may include a second relief valve that releases hydrogen gas inside a corresponding one of the plurality of the reserve tanks into atmosphere, and the control section may perform control so that, when a pressure of the hydrogen gas inside each of the plurality of the reserve tanks is greater than or equal to a predetermined set value, each of the second relief valves is opened and hydrogen inside a corresponding one of the plurality of the reserve tanks is discharged.

Each of the plurality of the reserve tanks may include a hydrogen on-off valve that opens and closes the hydrogen gas supply path, and a hot water on-off valve that opens and closes a hot water path in which hot water for warming an inside of each of the plurality of the reserve tanks is to flow, and the control section may perform control so that the hydrogen on-off valve and the hot water on-off valve of one reserve tank of all of the reserve tanks are opened and so that the hydrogen on-off valve and the hot water on-off valve of the reserve tank other than the one reserve tank are all closed.

The plurality of the hydrogen tanks may be configured so that two or more of the hydrogen tanks are connected in series or in parallel.

A fuel cell system according to a fourth aspect of the present invention includes the hydrogen supply system according to any one of the first aspect to the third aspect.

A working machine according to a fifth aspect of the present invention includes the fuel cell system according to the fourth aspect.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
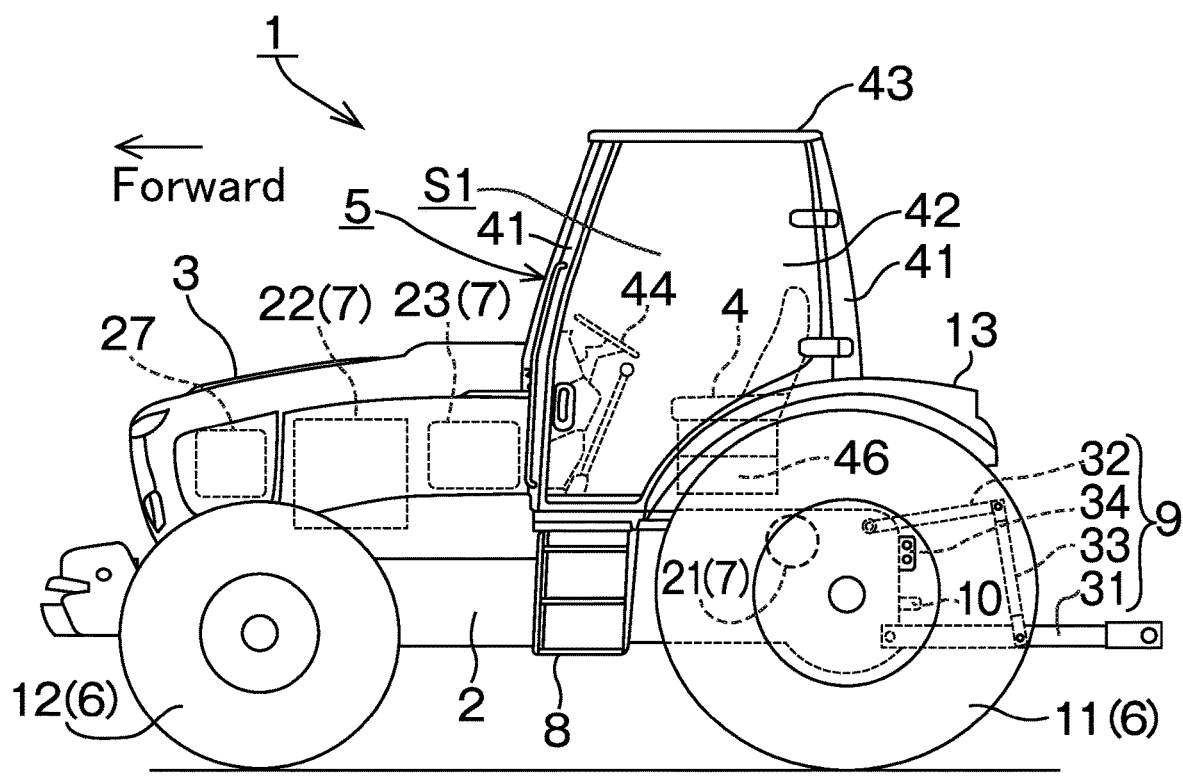
FIG. 1 is a schematic side view of an agricultural tractor according to a first embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

Embodiments according to the present invention are described below with reference to the drawings. Note that, in each embodiment below, corresponding structural elements are given the same reference numerals and are not described below.

First Embodiment

Figure 2:
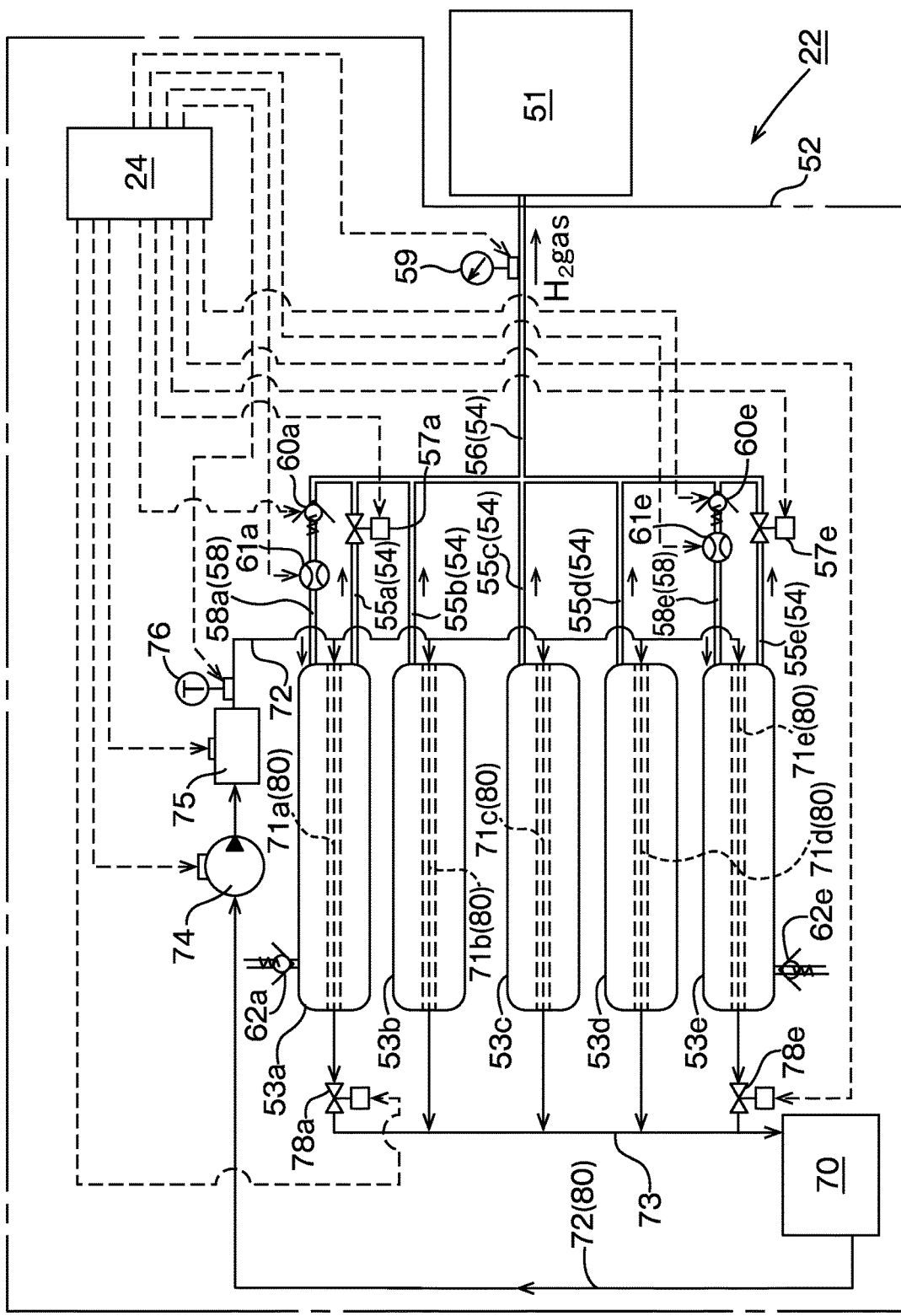
FIG. 2 is a block diagram of a schematic structure of a fuel cell system in FIG. 1.
Figure 3:
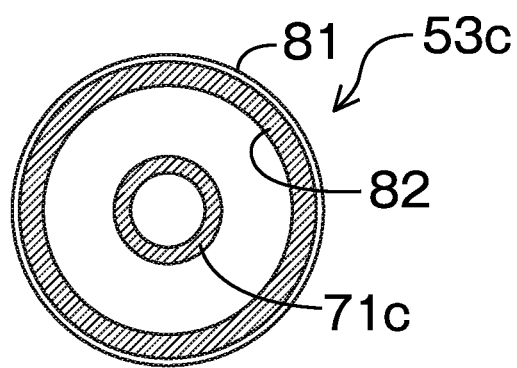
FIG. 3 is a vertical sectional enlarged view of a hydrogen tank in FIG. 2 including a hydrogen storage alloy therein.

FIGS. 1 to 3 show a hydrogen supply system 52, a fuel cell system 22, and an agricultural tractor (working machine) 1 according to a first embodiment of the present invention. In the present embodiment, a vehicle movement direction (arrow pointing a forward direction) corresponds to a forward direction of the tractor 1 and each component for the tractor 1, and to a forward direction of the systems; and a left-right direction as seen from an operator in the tractor corresponds to a left-right direction of the tractor 1 and each component for the tractor 1, and to a left-right direction of the systems. Here, the agricultural tractor 1 includes a fuel cell 51 that generates electricity by an electrochemical reaction between a fuel gas and an oxidizing agent gas, and is configured so that electric power generated by the fuel cell 51 is a power source.

FIG. 1 is a schematic side view of the agricultural tractor 1 according to the first embodiment of the present invention. FIG. 1 shows a left side of the tractor 1 in its entirety. The tractor 1, which is a working machine, in FIG. 1 includes a vehicle body 2 that is long in a front-rear direction, a hood 3 that is provided at a front portion of the vehicle body 2, a cabin 5 that is provided at a rear portion of the vehicle body 2 and that houses an operator's seat 4 on which an operator is to be seated, a wheel-type traveling device 6 that supports the vehicle body 2 so that the vehicle body 2 is capable of traveling, a driving device 7 that drives the traveling device 6, a three-point linkage 9 that is provided at a rear end of the vehicle body 2, and a PTO shaft (driving-force take-out shaft) 10 for transmitting thereto power from the driving device 7. Although, in the present embodiment, an agricultural tractor is used and described as the working machine 1, the present invention is not limited thereto. As the working machine 1, another type of working machine, for example, an agricultural machine, such as a rice-planting machine or a combine, or a construction machine, such as a backhoe, a compact track loader, or a skid-steer loader, can be used.

The traveling device 6 in FIG. 1 includes a pair of left and right rear wheels 11 and a pair of left and right front wheels 12, and fenders 13 that each cover a corresponding one of the rear wheels 11 from thereabove. Here, the traveling device 6 is a four-wheel drive tractor of a two-wheel-drive and four-wheel-drive switching type, and is configured so that switching can be performed between a two-wheel drive state, in which only the rear wheels 11 are driven, and a four-wheel drive state, in which the rear wheels 11 and the front wheels 12 are driven. Note that the present invention is also applicable to a two-wheel drive tractor, in which only the rear wheels are driven, or a tractor including a crawler traveling device.

The driving device 7 in FIG. 1 is disposed near the rear wheels 11, and includes an alternating-current driving motor (electric motor) 21 that drives the wheels or the crawlers of the traveling device 6, the fuel cell system 22 that is disposed inside the hood 3 and that supplies electric power to the driving motor 21, and a controller 23 that is disposed inside the hood 3 and that controls the supply of electric power to the driving motor 21 from the fuel cell system 22. The driving device 7 may also include a hydrogen gas detector that detects hydrogen gas, in which case an exhaust door that opens to cause an internal space S1 of the cabin 5 and the outside to communicate with each other when the hydrogen gas detector detects hydrogen gas may be provided at a ceiling wall 43 of the cabin 5.

Here, an output shaft of the driving motor 21 is indirectly interlocked with an axle of the rear wheels 11 via a transmission mechanism or is directly interlocked with the axle of the rear wheels 11, and is interlocked with the front wheels 12 switchably via a two-wheel-drive and four-wheel-drive switching mechanism. The fuel cell system 22 generates electricity by causing hydrogen gas that is supplied from hydrogen tanks 53*a* to 53*e* (described below) to react with air (oxygen) taken in from the outside, and supplies the electric power to the driving motor 21. The controller 23 has an inverter function, and converts direct-current electricity that is generated by the fuel cell system 22 into alternating-current electricity, and controls the frequency to control the rotation of the driving motor 21. A battery 27 that stores excess electricity of the electric power that is supplied to the driving motor 21 from the fuel cell system 22 is disposed inside the hood 3, and the controller 23 may be configured to control the rotation of the driving motor 21 by using the electric power stored in the battery 27.

The three-point linkage 9 in FIG. 1 includes a pair of left and right lower links 31 that are supported by a lower portion of the rear end of the vehicle body 2 rotatably in an up-down direction, a pair of left and right lift arms 32 that are supported by an upper portion of the rear end of the vehicle body 2 rotatably in the up-down direction and that drives a hydraulic device, a coupling link 33 that couples a rear end portion of each lift arm 32 and an intermediate portion of each lower link 31 and rotates the lower links 31 by the rotation of the lift arms 32, and a bracket 34 for mounting upper links. Here, various types of working machines are supported movably in the up-down direction by the upper links that are coupled to rear ends of the pair of left and right lower links 31 and to the bracket 34. An input section of various types of working machines is coupled to the PTO shaft 10 via a drive shaft. The PTO shaft 10 rotates due to power being transmitted thereto from the driving motor 21. Here, the working machines are, for example, cultivators for cultivating, fertilizer spreaders for spreading a fertilizer, agricultural chemical spreaders for spreading an agricultural chemical, harvesters for harvesting, mowers for cutting grass or the like, tedders for tedding grass or the like, rakes for raking grass or the like, or balers (roll balers) for baling grass or the like.

The cabin 5 in FIG. 1 includes four cabin frames (supports) 41 that stand from a corresponding one of the four corners; transparent walls (no reference numerals) that cover a corresponding one of a front side and a rear side of the cabin 5; transparent entry/exit doors 42 that cover a corresponding one of a right side and a left side of the cabin 5, and the ceiling wall 43. Here, a manipulating device 44 including, for example, a steering wheel is disposed forward of the operator's seat 4, and an air conditioner unit 46 that air-conditions the internal space S1 of the cabin 5 is disposed below the operator's seat 4. At least one entry/exit step 8 on which an operator places his foot when getting into and out of the cabin 5 is disposed below the cabin 5. Here, a plurality of the entry/exit steps 8 are provided below a corresponding one of the entry/exit doors 42 on the left and right sides.

FIG. 2 is a block diagram of a schematic structure of the fuel cell system 22 in FIG. 1. The fuel cell system 22 in FIG. 2 includes the fuel cell 51 that generates electricity by using hydrogen gas, and the hydrogen supply system 52 that supplies hydrogen gas to the fuel cell 51. The hydrogen supply system 52 in FIG. 2 includes five hydrogen tanks 53*a*, 53*b*, 53*c*, 53*d*, and 53*e* that are connected in parallel and disposed in parallel and that store hydrogen gas (and hydrogen), a hydrogen gas supply path 54 that connects the hydrogen tanks 53*a*, 53*b*, 53*c*, 53*d*, and 53*e* to the fuel cell 51 so as to allow the hydrogen gas to circulate, and that supplies the hydrogen gas to the fuel cell 51 from each of the hydrogen tanks 53*a* to 53*e*, a hot water path 80 in which hot water for heating each of the hydrogen tanks 53*a* to 53*e* is to flow, and a control section 24 that controls the supply of hydrogen gas and the supply of hot water and the opening and closing of various valves related thereto inside the fuel cell system 22. Note that, in the present invention, for convenience's sake, an example in which five hydrogen tanks are disposed is described. However, the present invention is not limited thereto, and, thus, a plurality of hydrogen tanks other than five hydrogen tanks may be disposed. Here, the plurality of hydrogen tanks may be connected in series or in parallel.

The hydrogen gas supply path 54 in FIG. 2 is provided with hydrogen gas supply pipes 55*a*, 55*b*, 55*c*, 55*d*, and 55*e* that are each connected to a hydrogen inlet/outlet of a corresponding one of the hydrogen tanks 53*a* to 53*e*, and a hydrogen gas collecting pipe 56 that causes all of the hydrogen gas supply pipes 55*a*, 55*b*, 55*c*, 55*d*, and 55*e* to be gathered and to be connected to the fuel cell 51.

In the present embodiment, at least one hydrogen tank of the plurality of hydrogen tanks 53*a* to 53*e* is used as a reserve tank that is connected to the hydrogen gas supply path 54 via a hydrogen gas recovery pipe 58*a* or 58*e* (hydrogen gas recovery path 58), and that stores hydrogen gas that was not used in generating electricity in the fuel cell 51. Specifically, of the five hydrogen tanks 53*a* to 53*e* disposed in parallel, the hydrogen tanks 53*a* and 53*e*, which are the two hydrogen tanks on two sides, are reserve tanks for recovering excess hydrogen gas. Here, the hydrogen tanks 53*a* and 53*e*, which are the two hydrogen tanks on the two sides, are described below as a first reserve tank 53*a* and a second reserve tank 53*e*.

Referring to FIG. 2, the hydrogen gas supply pipe 55*a* connected to the first reserve tank 53*a* and the hydrogen gas supply pipe 55*e* connected to the second reserve tank 53*e* include a corresponding one of hydrogen on-off valves 57*a* and 57*e* that each open and close a path to the hydrogen gas supply path 54. At the first reserve tank 53*a*, the hydrogen gas recovery pipe 58*a* (hydrogen gas recovery path 58) is connected in parallel with the hydrogen gas supply pipe 55*a*, and, at the second reserve tank 53*e*, the hydrogen gas recovery pipe 58*e* (hydrogen gas recovery path 58) is connected in parallel with the hydrogen gas supply pipe 55*e*. An end of each of the hydrogen gas recovery pipes 58*a* and 58*e* is connected to the hydrogen gas collecting pipe 56. Each of the hydrogen gas recovery pipes 58*a* and 58*e* (hydrogen gas recovery path 58) includes a corresponding one of first relief valves 60*a* and 60*e* and a corresponding one of flowmeters 61*a* and 61*e*, the first relief valves 60*a* and 60*e* opening and closing a corresponding one of the reserve tanks (the first reserve tank 53*a* and the second reserve tank 53*e*). Here, each of the flowmeters 61*a* and 61*e* measures the flow rate of hydrogen gas that is recovered by a corresponding one of the first reserve tank 53*a* and the second reserve tank 53*e* via a corresponding one of the hydrogen gas recovery pipes 58*a* and 58*e* from the hydrogen gas collecting pipe 56. At each of the first reserve tank 53*a* and the second reserve tank 53*e*, a corresponding one of second relief valves 62*a* and 62*e* that release hydrogen gas inside a corresponding one of the reserve tanks (the first reserve tank 53*a* and the second reserve tank 53*e*) into the atmosphere is disposed at each of the reserve tanks (the first reserve tank 53*a* and the second reserve tank 53*e*).

The hot water path 80 in FIG. 2 is provided with a hot water tank 70, hot water pipes 71*b*, 71*c*, and 71*d* that extend through a corresponding one of the three hydrogen tanks 53*b*, 53*c*, and 53*d*, hot water pipes 71*a* and 71*e* that extend through a corresponding one of the first reserve tank 53*a* and the second reserve tank 53*e*, a hot water supply pipe 72 that connects a hot water outlet of the hot water tank 70 and upstream ends of the respective hot water pipes 71*a*, 71*b*, 71*c*, 71*d*, and 71*e*, and a hot water return pipe 73 that connects downstream ends of the respective hot water pipes 71*a*, 71*b*, 71*c*, 71*d*, and 71*e* and a hot water return port of the hot water tank 70. The hot water supply pipe 72 includes, for example, a water pump 74 that causes hot water to circulate in the hot water path 80, a heater 75 that warms hot water that flows in the hot water path 80, and a thermometer 76 that measures the temperature of hot water on a downstream side (exit side) of the heater 75. Downstream end portions of the hot water pipes 71*a* and 71*e* disposed at a corresponding one of the first reserve tank 53*a* and the second reserve tank 53*e* are provided with a corresponding one of hot water on-off valves 78*a* and 78*e* that open and close the hot water path 80 in which hot water for warming the inside of the first reserve tank 53*a* and the second reserve tank 53*e* is to flow.

The control section 24 in FIG. 2 performs control so that, when the pressure of hydrogen gas inside the hydrogen gas supply path 54 is greater than or equal to a predetermined set value, each of the first relief valves 60*a* and 60*e* is opened and hydrogen gas that was not used in generating electricity in the fuel cell 51 is sucked into each reserve tank (the first reserve tank 53*a* and the second reserve tank 53*e*). In addition, the control section 24 performs control so that, when the pressure of hydrogen gas inside each reserve tank (the first reserve tank 53*a* and the second reserve tank 53*e*) is greater than or equal to a predetermined set value, each of the second relief valves 62*a* and 62*e* is opened and hydrogen gas inside each reserve tank (the first reserve tank 53*a* and the second reserve tank 53*e*) is discharged. Further, the control section 24 performs control so that, in storing in each reserve tank (the first reserve tank 53*a* and the second reserve tank 53*e*) hydrogen gas that was not used in generating electricity, when the amount of hydrogen gas that is stored inside a predetermined one of the reserve tanks becomes greater than or equal to a predetermined amount, suction with respect to the predetermined one of the reserve tanks is stopped, and suction with respect to the reserve tank other than the predetermined one of the reserve tanks is started. Here, "predetermined one of the reserve tanks" may refer to either one of the first reserve tank 53*a* and the second reserve tank 53*e*, or may refer to both of the first reserve tank 53*a* and the second reserve tank 53*e*.

The control section 24 in FIG. 2 is electrically connected to each of the hydrogen on-off valves 57*a* and 57*e*, and controls each of the hydrogen on-off valves 57*a* and 57*e* so as to be electrically opened and closed. That is, the control section 24 performs control so as to open and close a location between the first reserve tank 53*a* and the hydrogen gas collecting pipe 56 and a location between the second reserve tank 53*e* and the hydrogen gas collecting pipe 56 at a desired period of time.

The control section 24 performs control so that, when the pressure of hydrogen gas inside the hydrogen gas collecting pipe 56 becomes greater than or equal to a predetermined set value P1, each of the first relief valves 60*a* and 60*e* is opened to recover (store) excess hydrogen gas into a corresponding one of the first reserve tank 53*a* and the second reserve tank 53*e* from the hydrogen gas collecting pipe 56. Note that, in the present embodiment, the control section 24 performs control so that, when the pressure of the hydrogen gas inside the hydrogen gas collecting pipe 56 becomes greater than or equal to the predetermined set value P1 of 1.0 MPa or lower, each of the first relief valves 60*a* and 60*e* is opened.

The control section 24 performs control so that, when the value of a flow rate, measured by the flowmeter 61*a*, of hydrogen gas that is recovered by the first reserve tank 53*a* and the value of a flow rate, measured by the flowmeter 61*e*, of hydrogen gas that is recovered by the second reserve tank 53e are obtained and integrated, and when the amount of hydrogen gas in the first reserve tank 53a and the amount of hydrogen gas in the second reserve tank 53e have reached a predetermined amount V, the first relief valve 60a of the first reserve tank 53a and the first relief valve 60e of the second reserve tank 53e are closed.

The control section 24 performs control so that, when the pressure of hydrogen gas in the first reserve tank 53a and the pressure of hydrogen gas in the second reserve tank 53e are greater than or equal to a predetermined set value P2, the second relief valves 62a and 62e are opened and thus the hydrogen gas inside the first reserve tank 53a and the hydrogen gas in the second reserve tank 53e are released. Here, the set value P2 is greater than the set value P1 above, and, for example, the pressure of hydrogen gas in the first reserve tank 53a and the pressure of hydrogen gas in the second reserve tank 53e are values greater than or equal to 1.0 MPa.

The water pump 74, the heater 75, and the thermometer 76 are electrically connected to the control section 24. Based on temperature data of hot water on a downstream side (exit side) of the heater 75 obtained by the thermometer 76, the control section 24 controls energization of the heater 75 so that the hot water becomes a desired temperature. The control section 24 controls the water pump 74 so that the hot water flow rate (output amount) becomes a desired hot water flow rate.

The control section 24 is electrically connected to each of the hot water on-off valves 78a and 78e, and controls each of the hot water on-off valves 78a and 78e so that the hot water flow rate in the hot water pipe 71a in the first reserve tank 53a and the hot water flow rate in the hot water pipe 71e in the second reserve tank 53e become desired hot water flow rates.

FIG. 3 is a vertical sectional enlarged view of the hydrogen tank 53c. The hydrogen tank 53c is a MH tank that includes a hydrogen storage alloy therein as described above, and has a hydrogen storage alloy layer 82 having an internal space filled with hydrogen gas. For example, carbon fiber reinforced plastics (CFRP) 81 covers an outer surface of the hydrogen storage alloy layer 82. The hydrogen storage alloy layer 82 absorbs hydrogen gas through pressure increase or cooling, and releases hydrogen gas through pressure reduction or heating. The hydrogen storage alloy layer 82 is capable of absorbing hydrogen having a volume that is greater than or equal to 1000 times the volume of the hydrogen storage alloy layer 82 itself. The same applies to the other hydrogen tanks 53b and 53d and the first reserve tank 53a and the second reserve tank 53e in FIG. 2.

The operations and the operational effects of the hydrogen supply system 52 having the structure above are described below.

(a) In the present embodiment, in a preparation stage before operation, the first reserve tank 53a and the second reserve tank 53e are not made to absorb hydrogen, and, at the time of a first operation, only the first reserve tank 53a is used for recovering excess hydrogen gas, and the second reserve tank 53e is such that the first relief valve 60e is fixed in a closed state and the hydrogen on-off valve 57e and the hot water on-off valve 78e are closed.

(b) At the time of the operation, when hydrogen gas is to be supplied to the fuel cell 51, as described above, the hydrogen on-off valve 57a and the hot water on-off valve 78a of the first reserve tank 53a are closed, and the second reserve tank 53e is such that, not only are the hydrogen on-off valve 57e and the hot water on-off valve 78e kept in a closed state, but also the first relief valve 60e of the hydrogen gas recovery pipe 58e is also fixed in a closed state. Therefore, at the time of the operation, only hydrogen gas from three hydrogen tanks 53b, 53c, and 53d, is supplied to the fuel cell 51.

(c) During the operation, when a state in which the three hydrogen tanks 53b, 53c, and 53d supply a large amount of hydrogen gas becomes a state in which the fuel cell 51 no longer requires hydrogen gas, the pressure of hydrogen gas in the hydrogen gas collecting pipe 56 is suddenly increased. When the pressure of the hydrogen gas inside the hydrogen gas collecting pipe 56 eventually becomes greater than or equal to the set value P1 of the first relief valve 60a, the first relief valve 60a is opened and excess hydrogen gas inside the hydrogen gas collecting pipe 56 is recovered by the first reserve tank 53a via the hydrogen gas recovery pipe 58a.

(d) The flow rate of the excess hydrogen gas that is recovered by the inside of the first reserve tank 53a is measured and integrated by the flowmeter 61a, and, when the amount of hydrogen gas inside the first reserve tank 53a reaches the predetermined amount V, the first relief valve 60a is fixed in a closed state to prevent the excess hydrogen gas from entering from the hydrogen gas collecting pipe 56. At the same time, the first relief valve 60e of the second reserve tank 53e fixed in the closed state is brought back to an operable state and the second reserve tank 53e is used to recover the excess hydrogen gas.

The effects provided by the present embodiment are summarized as follows.

(a) Since an excess of hydrogen gas that is supplied to the fuel cell 51 is reused by being temporarily recovered by the first reserve tank 53a or the second reserve tank 53e for recovering the hydrogen gas, the hydrogen gas is not immediately released to outside air and thus wasteful consumption of the hydrogen gas can be reduced.

(b) When the pressure of hydrogen gas inside the first reserve tank 53a for recovering excess hydrogen gas becomes greater than the predetermined set value P2, the second relief valve 62a opens and part of the hydrogen gas inside the first reserve tank 53a is released to the outside, as a result of which the lifetime of the first reserve tank 53a is maintained, and maintenance does not require time and effort. Naturally, the same effects are provided with regard to the second reserve tank 53e.

(c) Since the hot water pipe 71a that is disposed in the first reserve tank 53a for recovering excess hydrogen gas is provided with the hot water on-off valve 78a, the first reserve tank 53a is prevented from being wastefully heated, and energy is saved. Naturally, the same effects are provided with regard to the second reserve tank 53e.

(d) When the control section 24 performs control so that, when the hydrogen on-off valve 57a of the first reserve tank 53a is closed, the hot water on-off valve 78a is closed and so that, when the hydrogen on-off valve 57a is opened, the hot water on-off valve 78a is opened, it is possible to efficiently use hot water. The same applies to the control of the hydrogen on-off valve 57e and the hot water on-off valve 78e of the second reserve tank 53e.

(e) When two hydrogen tanks, the first reserve tank 53a and the second reserve tank 53e, for recovering excess hydrogen gas are provided, it is possible to increase the amount of recovery of the excess hydrogen gas.

(f) When the control section 24 automatically uses alternately the first reserve tank 53a and the second reserve tank 53e to recover excess hydrogen gas, since one of the first reserve tank 53a and the second reserve tank 53e can be used for ordinary hydrogen gas supply while the other of the first reserve tank 53a and the second reserve tank 53e is being used for recovering excess hydrogen gas, it is possible to efficiently use the first reserve tank 53a and the second reserve tank 53e.

Modification 1

In the present embodiment, at least one hydrogen tank of the plurality of hydrogen tanks that store hydrogen gas is described as being a reserve tank that stores hydrogen gas that was not used in generating electricity in the fuel cell 51. However, the present invention is not limited to the embodiment above. For example, in a modification of the embodiment above, at least one hydrogen tank that stores hydrogen gas and at least one reserve tank that stores hydrogen gas that was not used in generating electricity in the fuel cell 51 may be provided. Even the present modification can realize operations and operational effects that are the same as those provided by the present embodiment.

Modification 2

In the present embodiment and Modification 1, in the preparation stage before operation, the first reserve tank 53a and the second reserve tank 53e are not made to absorb hydrogen, and, at the time of the first operation, only the first reserve tank 53a is used for recovering excess hydrogen gas, and the second reserve tank 53e is such that the first relief valve 60e is fixed in a closed state and the hydrogen on-off valve 57e and the hot water on-off valve 78e are closed. In contrast, in the present modification, in the preparation stage before operation, only the first reserve tank 53a remains in the state of not absorbing hydrogen and is used for recovering excess hydrogen gas, and the second reserve tank 53e is made to absorb hydrogen as with the other hydrogen tanks 53b, 53c, and 53d. The details are described below.
- (a) Before the operation, when the hydrogen supply system 52 is made to absorb hydrogen (is filled with hydrogen), for example, the hydrogen on-off valve 57a of the first reserve tank 53a is closed, and the hydrogen on-off valve 57e of the second reserve tank 53e is kept open to suck in hydrogen gas via the hydrogen gas collecting pipe 56 from a hydrogen filling station or the like. Therefore, the hydrogen tanks 53b, 53c, and 53d and the second reserve tank 53e suck in hydrogen gas and absorb hydrogen. On the other hand, the first reserve tank 53a whose hydrogen on-off valve 57a is closed does not suck in hydrogen gas and remains in an empty state. Note that at the time of filling the hydrogen supply system 52 with hydrogen gas, hot water is stopped inside the hot water path.
- (b) At the time of operation, when hydrogen gas is to be supplied to the fuel cell 51, the hydrogen on-off valve 57a and the hot water on-off valve 78a of the first reserve tank 53a are in a closed state. In the hot water path 80, the water pump 74 and the heater 75 are operated to cause hot water whose temperature has been increased to a predetermined temperature to circulate inside the hot water pipes 71b, 71c, 71d, and 71e, and the three hydrogen tanks 53b, 53c, and 53d, and the second reserve tank 53e are heated. Therefore, hydrogen gas is supplied to the fuel cell 51 via each of the hydrogen gas supply pipes 55b, 55c, 55d, and 55e and the hydrogen gas collecting pipe 56. At this time, the first reserve tank 53a is in a non-heating state, and communicates with the hydrogen gas collecting pipe 56 and the other hydrogen gas supply pipes 55b, 55c, 55d, and 55e via only the hydrogen gas recovery pipe 58a having the first relief valve 60a. By supplying the hydrogen gas to the fuel cell 51 as described above, in the fuel cell 51, air (oxygen) taken in from outside air and the hydrogen gas are caused to react with each other to generate electricity as is well known. The generated electric power is supplied to the driving motor 21 and the driving motor 21 is operated to use the electric power not only to cause the tractor 1 to travel but also to drive various types of working machines to which power is transmitted from the PTO shaft 10.
- (c) During the operation, when a state in which the hydrogen tanks 53b, 53c, and 53d and the second reserve tank 53e supply a large amount of hydrogen gas becomes a state in which the fuel cell 51 no longer requires hydrogen due to, for example, stopping farm working or the like, the pressure of hydrogen gas that is supplied to the hydrogen gas collecting pipe 56 from the hydrogen tanks 53b, 53c, and 53d and the second reserve tank 53e is suddenly increased. When the pressure of the hydrogen gas inside the hydrogen gas collecting pipe 56 eventually exceeds the pressure set value P1 of the first relief valve 60a of the first reserve tank 53a, the first relief valve 60a is opened, and excess hydrogen gas inside the hydrogen gas collecting pipe 56 and the hydrogen gas supply pipes 55b, 55c, 55d, and 55e is recovered (stored) by the inside the first reserve tank 53a via the hydrogen gas recovery pipe 58a. That is, the excess hydrogen gas is recovered by the first reserve tank 53a without being released into the atmosphere. Since, at this time, the first reserve tank 53a is not heated, the first reserve tank 53a efficiently stores a large amount of excess hydrogen gas and absorbs it as hydrogen.
- (d) In a state in which the hydrogen gas in the hydrogen tanks 53b, 53c, and 53d and the second reserve tank 53e has been used up, only the first reserve tank 53a is in a hydrogen absorption state. Therefore, when the hydrogen supply system 52 is made to absorb hydrogen (is filled with hydrogen) from a hydrogen filling station or the like the next time, the hydrogen on-off valve 57a of the first reserve tank 53a is opened, whereas the hydrogen on-off valve 57e of the second reserve tank 53e is kept closed, to suck in hydrogen gas via the hydrogen gas collecting pipe 56 from a hydrogen filling station or the like. Therefore, hydrogen is absorbed by three hydrogen tanks 53b, 53c, and 53d. The first reserve tank 53a is already in the hydrogen absorption state as described above. Consequently, in the next operation, the second reserve tank 53e is used for recovering excess hydrogen gas.
- (e) As described above, by alternately making use of a cycle in which the hydrogen on-off valve 57a and the hot water on-off valve 78a of the first reserve tank 53a are closed and a cycle in which the hydrogen on-off valve 57e and the hot water on-off valve 78e of the second reserve tank 53e are closed, it is possible to efficiently recover and reuse a large amount of excess hydrogen gas.
- (f) Note that, in using the first reserve tank 53a for recovering excess hydrogen gas, when the pressure of hydrogen gas inside the first reserve tank 53a becomes greater than or equal to the set value P2 of the second relief valve 62*a*, from the viewpoint of ensuring safety, the second relief valve 62*a* is opened and part of the hydrogen gas inside the first reserve tank 53*a* is released to the outside.

(g) Even in using the second reserve tank 53*e* for recovering excess hydrogen gas, when the pressure of hydrogen gas inside the second reserve tank 53*e* becomes greater than or equal to the set value P2, from the viewpoint of ensuring safety, the second relief valve 62*e* is opened and the hydrogen gas inside the second reserve tank 53*e* is released to the outside.

Even the present modification can provide operational effects that are the same as those provided by the present embodiment and Modification 1.

Note that, in, for example, the present embodiment, for convenience's sake, an example in which three hydrogen tanks are disposed is described. However, the present invention is not limited thereto, and, thus, for example, one hydrogen tank or a plurality of hydrogen tanks, other than three hydrogen tanks, may be disposed.

Here, the plurality of hydrogen tanks may be connected in series or in parallel.

In, for example, the present embodiment, an example in which two reserve tanks for recovering excess hydrogen gas are disposed is described. However, the present invention is not limited thereto, and, thus, for example, one or a plurality of reserve tanks, other than two reserve tanks, may be disposed. Here, the plurality of reserve tanks may be connected in series or in parallel.

In, for example, the present embodiment, the reserve tanks that are used for recovering excess hydrogen gas are hydrogen storage alloy tanks. However, the present invention is not limited thereto, and the reserve tanks may be general metallic high-pressure hydrogen tanks.

As described above, the hydrogen supply system 52 according to the first aspect of the present invention is a hydrogen supply system 52 that supplies hydrogen gas to the fuel cell 51 that generates electric power by using the hydrogen gas. The hydrogen supply system 52 includes a plurality of hydrogen tanks 53*a* to 53*e* that each store hydrogen gas, and hydrogen gas supply paths 55*a* to 55*e* and 56 that supply the hydrogen gas to the fuel cell 51 from each of the plurality of hydrogen tanks 53*a* to 53*e*. At least one of the hydrogen tanks 53*a* and 53*e* of the plurality of hydrogen tanks 53*a* to 53*e* is a reserve tank that is connected to the hydrogen gas supply paths 55*a* to 55*e*, and 56 via a hydrogen gas recovery path 58*a* or 58*e*, and that stores hydrogen gas that was not used in generating electricity in the fuel cell 51.

According to the hydrogen supply system 52 according to the first aspect, excess hydrogen gas that was not used in generating electricity of the fuel cell 51 after being output from the hydrogen tanks 53*b*, 53*c*, and 53*d* can be reused by being temporarily stored in the reserve tanks 53*a* and 53*e* for recovering excess hydrogen, and wasteful consumption of hydrogen gas can be reduced compared with that of a structure in which excess hydrogen gas is immediately released into the atmosphere as has been conventionally the case.

The present invention can include each of the following structures in addition to the hydrogen supply system 52 according to the first aspect.

(a) The hydrogen supply system 52 further includes a control section 24 that controls suction of the hydrogen gas that was not used in generating the electricity into each of a plurality of the reserve tanks 53*a* and 53*e*.

(b) In the hydrogen supply system 52, the hydrogen gas recovery paths 58*a* and 58*e* are each provided with a corresponding one of first relief valves 60*a* and 60*e* that each open and close a corresponding one of the plurality of the reserve tanks 53*a* and 53*e*, and the control section 24 performs control so that, when a pressure of hydrogen gas inside the hydrogen gas supply paths 55*a* to 55*e*, and 56 is greater than or equal to a predetermined set value, each of the first relief valves 60*a* and 60*e* is opened and the hydrogen gas that was not used in generating the electricity in the fuel cell 51 is sucked into each of the plurality of the reserve tanks 53*a* and 53*e*.

(c) In the hydrogen supply system 52, each of the plurality of the reserve tanks 53*a* and 53*e* includes a corresponding one of second relief valves 62*a* and 62*e* that each release hydrogen gas inside a corresponding one of the plurality of the reserve tanks 53*a* and 53*e* into atmosphere, and the control section 24 performs control so that, when a pressure of the hydrogen gas inside each of the plurality of the reserve tanks 53*a* and 53*e* is greater than or equal to a predetermined set value, each of the second relief valves 62*a* and 62*e* is opened and hydrogen inside a corresponding one of the plurality of the reserve tanks 53*a* and 53*e* is discharged.

(d) In addition to any one of the structures (a) to (c) being provided, the control section 24 performs control so that, in storing in the reserve tanks 53*a* and 53*e* the hydrogen gas that was not used in generating the electricity, when an amount of hydrogen gas that is stored inside a predetermined reserve tank 53*a* (53*e*) becomes greater than or equal to a predetermined amount, suction with respect to the predetermined reserve tank 53*a* (53*e*) is stopped, and suction with respect to the reserve tank 53*e* (53*a*) other than the predetermined reserve tank 53*a* (53*e*) is started.

(e) In addition to any one of the structures (a) to (d) being provided, each of the plurality of the reserve tanks 53*a* and 53*e* includes a corresponding one of hydrogen on-off valves 57*a* and 57*e* that open and close the hydrogen gas supply paths 55*a* to 55*e*, and 56, and a corresponding one of hot water on-off valves 78*a* and 78*e* that open and close a hot water path 80 in which hot water for warming an inside of each of the reserve tanks 53*a* and 53*e* is to flow. The control section 24 controls opening and closing of the hydrogen on-off valves 57*a* and 57*e* of the respective reserve tanks 53*a* and 53*e* and opening and closing of the hot water on-off valves 78*a* and 78*e* of the respective reserve tanks 53*a* and 53*e*.

(f) In addition to any one of the structures (a) to (e) being provided, the plurality of hydrogen tanks 53*a* to 53*e* are configured to be connected in series or in parallel.

The hydrogen supply system 52 according to the second aspect of the present invention is a hydrogen supply system 52 that supplies hydrogen gas to the fuel cell 51 that generates electric power by using the hydrogen gas. The hydrogen supply system 52 includes a plurality of hydrogen tanks 53*a* to 53*e* that each store hydrogen gas, and hydrogen gas supply paths 55*a* to 55*e*, and 56 that supply the hydrogen gas to the fuel cell 51 from each of the plurality of hydrogen tanks 53*a* to 53*e*. Two hydrogen tanks 53*a* and 53*e* of the plurality of hydrogen tanks 53*a* to 53*e* are a first reserve tank and a second reserve tank that are connected to the hydrogen gas supply paths 55*a* to 55*e*, and 56 via a corresponding one of hydrogen gas recovery paths 58*a* and 58*e*, and that store hydrogen gas that was not used in generating electricity in the fuel cell 51.

According to the hydrogen supply system 52 according to the second aspect, excess hydrogen gas that was not used in generating electricity of the fuel cell 51 after being output from the hydrogen tanks 53b to 53d can be reused by being temporarily stored in the reserve tanks 53a and 53e for recovering excess hydrogen, and wasteful consumption of hydrogen gas can be reduced compared with that of a structure in which excess hydrogen gas is immediately released into the atmosphere as has been conventionally the case.

The present invention can also include each of the following structures in addition to the hydrogen supply system 52 according to the second aspect.

- (g) The hydrogen supply system 52 further includes a control section (24) that controls suction of the hydrogen gas that was not used in generating the electricity into each of the first and second reserve tanks 53a and 53e.
- (h) In addition to the structure (g) being provided, the control section 24 performs control so that, in storing in the first and second reserve tanks 53a and 53e the hydrogen gas that was not used in generating the electricity, when an amount of hydrogen gas that is stored in the first reserve tank 53a becomes greater than or equal to a predetermined amount, suction with respect to the first reserve tank 53a is stopped, and suction with respect to the second reserve tank 53e is started.
- (i) In addition to the structure (g) or the structure (h) being provided, the first and second reserve tanks 53a and 53e each include a corresponding one hydrogen on-off valves 57a and 57e that open and close the hydrogen gas supply paths 55a to 55e, and 56, and a corresponding one of hot water on-off valves 78a and 78e that open and close a hot water path 80 in which hot water for warming an inside of each of the first and second reserve tanks 53a and 53e is to flow, and the control section 24 performs control so that the hydrogen on-off valve 57a and the hot water on-off valve 78a of the first reserve tank 53a are closed and so that the hydrogen on-off valve 57e and the hot water on-off valve 78e of the second reserve tank 53e are opened.
- (j) In addition to any one of the structures (g) to (i) being provided, the first and second reserve tanks 53a and 53e each include a corresponding one hydrogen on-off valves 57a and 57e that open and close the hydrogen gas supply paths 55a to 55e, and 56, and a corresponding one of hot water on-off valves 78a and 78e that open and close a hot water path 80 in which hot water for warming an inside of each of the first and second reserve tanks 53a and 53e is to flow, and the control section 24 performs control so that the hydrogen on-off valve 57e and the hot water on-off valve 78e of the second reserve tank 53e are closed and so that the hydrogen on-off valve 57a and the hot water on-off valve 78a of the first reserve tank 53a are opened.
- (k) In addition to any one of the structures (g) to (j) being provided, the plurality of hydrogen tanks 53a to 53e are configured to be connected in series or in parallel.

The hydrogen supply system 52 according to the third aspect of the present invention is a hydrogen supply system 52 that supplies hydrogen gas to the fuel cell 51 that generates electric power by using the hydrogen gas. The hydrogen supply system 52 includes at least one of hydrogen tanks 53b to 53d that stores hydrogen gas, hydrogen gas supply paths 55a to 55e, and 56 that supply the hydrogen gas to the fuel cell 51 from each of the at least one of hydrogen tanks 53b to 53d, and at least one of reserve tanks 53a and 53e that is connected to the hydrogen gas supply paths 55a to 55e, and 56 via a corresponding one of hydrogen gas recovery paths 58a and 58e, and that stores hydrogen gas that was not used in generating electricity in the fuel cell 51.

According to the hydrogen supply system 52 according to the third aspect, excess hydrogen gas that was not used in generating electricity of the fuel cell 51 after being output from the hydrogen tanks 53b to 53d can be reused by being temporarily stored in the reserve tanks 53a and 53e for recovering excess hydrogen, and wasteful consumption of hydrogen gas can be reduced compared with that of a structure in which excess hydrogen gas is immediately released into the atmosphere as has been conventionally the case.

The present invention can also include each of the following structures in addition to the hydrogen supply system 52 according to the third aspect.

- (m) The hydrogen supply system 52 further includes a control section (24) that controls suction of the hydrogen gas that was not used in generating the electricity into each of the at least one of reserve tanks 53a and 53e.
- (n) In addition to the structure (m) being provided, the hydrogen gas recovery paths 58a and 58e are each provided with a corresponding one of first relief valves 60a and 60e that each open and close a corresponding one of the reserve tanks 53a and 53e, and the control section 24 performs control so that, when a pressure of hydrogen gas inside the hydrogen gas supply paths 55a to 55e, and 56 is greater than or equal to a predetermined set value, each of the first relief valves 60a and 60e is opened and the hydrogen gas that was not used in generating the electricity in the fuel cell 51 is sucked into each of the reserve tanks 53a and 53e.
- (o) In addition to either the structure (m) or the structure (n) being provided, each of the reserve tanks 53a and 53e includes a corresponding one of second relief valves 62a and 62e that release hydrogen gas inside a corresponding one of the reserve tanks 53a and 53e into atmosphere, and the control section 24 performs control so that, when a pressure of the hydrogen gas inside each of the reserve tanks 53a and 53e is greater than or equal to a predetermined set value, each of the second relief valves 62a and 62e is opened and hydrogen inside a corresponding one of the reserve tanks 53a and 53e is discharged.
- (p) In addition to any one of the structures (m) to (o) being provided, each of the reserve tanks 53a and 53e includes a corresponding one of hydrogen on-off valves 57a and 57e that open and close the hydrogen gas supply paths 55a to 55e and 56, and a corresponding one of hot water on-off valves 78a and 78e that open and close a hot water paths 80 in which hot water for warming an inside of each of the reserve tanks 53a and 53e is to flow. The control section 24 performs control so that the hydrogen on-off valve 57a (57e) and the hot water on-off valve 78a (78e) of one reserve tank 53a (53e) of all of the reserve tanks 53a and 53e are opened and so that the hydrogen on-off valve 57e (57a) and the hot water on-off valve 78e (78a) of the reserve tank 53e (53a) other than the reserve tank 53a (53e) are all closed.
- (q) In addition to any one of the structures (m) to (p) being provided, the plurality of hydrogen tanks 53b to 53d are configured so that two or more of the hydrogen tanks 53b to 53d are connected in series or in parallel.

Further, the present invention provides the fuel cell system 22 including any one of the hydrogen supply systems 52 above and the working machine 1 including the fuel cell system 22.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydrogen supply system that supplies hydrogen gas to a fuel cell that generates electricity by using hydrogen gas, the hydrogen supply system comprising:
    a plurality of hydrogen tanks that each store hydrogen gas;
    a hydrogen gas supply path that supplies hydrogen gas to the fuel cell from each of the plurality of hydrogen tanks; and
    a hydrogen gas recovery path that connects at least one of the plurality of hydrogen tanks with the hydrogen gas supply path,
    wherein the at least one of the plurality of hydrogen tanks is a reserve tank that stores hydrogen gas that was not used in generating electricity in the fuel cell and that was received via the hydrogen gas recovery path.

2. The hydrogen supply system according to claim 1, further comprising:
    a control section that controls suction of the hydrogen gas that was not used in generating the electricity into each of a plurality of the reserve tanks.

3. The hydrogen supply system according to claim 2, wherein the hydrogen gas recovery path is provided with first relief valves that each open and close a corresponding one of the plurality of the reserve tanks, and
    wherein the control section performs control so that, when a pressure of hydrogen gas inside the hydrogen gas supply path is greater than or equal to a predetermined set value, each of the first relief valves is opened and the hydrogen gas that was not used in generating the electricity in the fuel cell is sucked into each of the plurality of the reserve tanks.

4. The hydrogen supply system according to claim 2, wherein each of the plurality of the reserve tanks includes a second relief valve that releases hydrogen gas inside a corresponding one of the plurality of the reserve tanks into atmosphere, and
    wherein the control section performs control so that, when a pressure of hydrogen gas inside each of the plurality of the reserve tanks is greater than or equal to a predetermined set value, each of the second relief valves is opened and hydrogen inside a corresponding one of the plurality of the reserve tanks is discharged.

5. The hydrogen supply system according to claim 2, wherein the control section performs control so that, in storing in the reserve tanks the hydrogen gas that was not used in generating the electricity, when an amount of hydrogen gas that is stored inside a predetermined one of the reserve tanks becomes greater than or equal to a predetermined amount, suction with respect to the predetermined one of the reserve tanks is stopped, and suction with respect to the reserve tank other than the predetermined one of the reserve tanks is started.

6. The hydrogen supply system according to claim 2, wherein each of the plurality of the reserve tanks includes a hydrogen on-off valve that opens and closes the hydrogen gas supply path, and
    a hot water on-off valve that opens and closes a hot water path, wherein hot water flows inside the hot water path for warming an inside of each of the plurality of the reserve tanks, and
    wherein the control section controls opening and closing of the hydrogen on-off valve of each of the plurality of the reserve tanks and opening and closing of the hot water on-off valve of each of the plurality of the reserve tanks.

7. The hydrogen supply system according to claim 1, wherein the plurality of hydrogen tanks are configured to be connected in series or in parallel.

8. A hydrogen supply system that supplies hydrogen gas to a fuel cell that generates electricity by using hydrogen gas, the hydrogen supply system comprising:
    a plurality of hydrogen tanks that each store hydrogen gas;
    a hydrogen gas supply path that supplies the hydrogen gas to the fuel cell from each of the plurality of hydrogen tanks; and
    hydrogen gas recovery paths that connect two of the plurality of hydrogen tanks with the hydrogen gas supply path,
    wherein two of the plurality of hydrogen tanks are a first reserve tank and a second reserve tank that store hydrogen gas that was not used in generating electricity in the fuel cell and that was received via the hydrogen gas recovery paths.

9. The hydrogen supply system according to claim 8, further comprising:
    a control section that controls suction of the hydrogen gas that was not used in generating the electricity into each of the first and second reserve tanks.

10. The hydrogen supply system according to claim 9, wherein the control section performs control so that, in storing in the first and second reserve tanks the hydrogen gas that was not used in generating the electricity, when an amount of hydrogen gas that is stored in the first reserve tank becomes greater than or equal to a predetermined amount, suction with respect to the first reserve tank is stopped, and suction with respect to the second reserve tank is started.

11. The hydrogen supply system according to claim 9, wherein the first and second reserve tanks each include
    a hydrogen on-off valve that opens and closes the hydrogen gas supply path, and
    a hot water on-off valve that opens and closes a hot water path, wherein hot water flows inside the hot water path for warming an inside of each of the first and second reserve tanks, and
    wherein the control section performs control so that the hydrogen on-off valve and the hot water on-off valve of the first reserve tank are closed and so that the hydrogen on-off valve and the hot water on-off valve of the second reserve tank are opened.

12. The hydrogen supply system according to claim 9, wherein the first and second reserve tanks each include
    a hydrogen on-off valve that opens and closes the hydrogen gas supply path, and
    a hot water on-off valve that opens and closes a hot water path, wherein hot water flows inside the hot water path for warming an inside of each of the first and second reserve tanks, and
    wherein the control section performs control so that the hydrogen on-off valve and the hot water on-off valve of the second reserve tank are closed and so that the hydrogen on-off valve and the hot water on-off valve of the first reserve tank are opened.

13. The hydrogen supply system according to claim 8, wherein the plurality of hydrogen tanks are configured to be connected in series or in parallel.

14. A hydrogen supply system that supplies hydrogen gas to a fuel cell that generates electricity by using hydrogen gas, the hydrogen supply system comprising:
- at least one hydrogen tank that stores hydrogen gas;
- a hydrogen gas supply path that supplies hydrogen gas to the fuel cell from each of the at least one hydrogen tank including a plurality of the hydrogen tanks;
- a hydrogen gas recovery path that is connected to the hydrogen gas supply path; and
- at least one reserve tank that is connected to the hydrogen gas recovery path and that stores hydrogen gas that was not used in generating electricity in the fuel cell and that was received via the hydrogen gas recovery path.

15. The hydrogen supply system according to claim 14, further comprising:
- a control section that controls suction of the hydrogen gas that was not used in generating the electricity into each of the at least one reserve tank including a plurality of the reserve tanks.

16. The hydrogen supply system according to claim 15, wherein the hydrogen gas recovery path is provided with first relief valves that each open and close a corresponding one of the plurality of the reserve tanks, and
wherein the control section performs control so that, when a pressure of hydrogen gas inside the hydrogen gas supply path is greater than or equal to a predetermined set value, each of the first relief valves is opened and the hydrogen gas that was not used in generating the electricity in the fuel cell is sucked into each of the plurality of the reserve tanks.

17. The hydrogen supply system according to claim 15, wherein each of the plurality of the reserve tanks includes a second relief valve that releases hydrogen gas inside a corresponding one of the plurality of the reserve tanks into atmosphere, and
wherein the control section performs control so that, when a pressure of hydrogen gas inside each of the plurality of the reserve tanks is greater than or equal to a predetermined set value, each of the second relief valves is opened and hydrogen inside a corresponding one of the plurality of the reserve tanks is discharged.

18. The hydrogen supply system according to claim 15, wherein each of the plurality of the reserve tanks includes
- a hydrogen on-off valve that opens and closes the hydrogen gas supply path, and
- a hot water on-off valve that opens and closes a hot water path, wherein hot water flows inside the hot water path for warming an inside of each of the plurality of the reserve tanks, and
wherein the control section performs control so that the hydrogen on-off valve and the hot water on-off valve of one reserve tank of all of the reserve tanks are opened and so that the hydrogen on-off valve and the hot water on-off valve of the reserve tank other than the one reserve tank are all closed.

19. A fuel cell system comprising:
the hydrogen supply system according to claim 1.

20. A working machine comprising:
the fuel cell system according to claim 19.

* * * * *